UNITED STATES PATENT OFFICE.

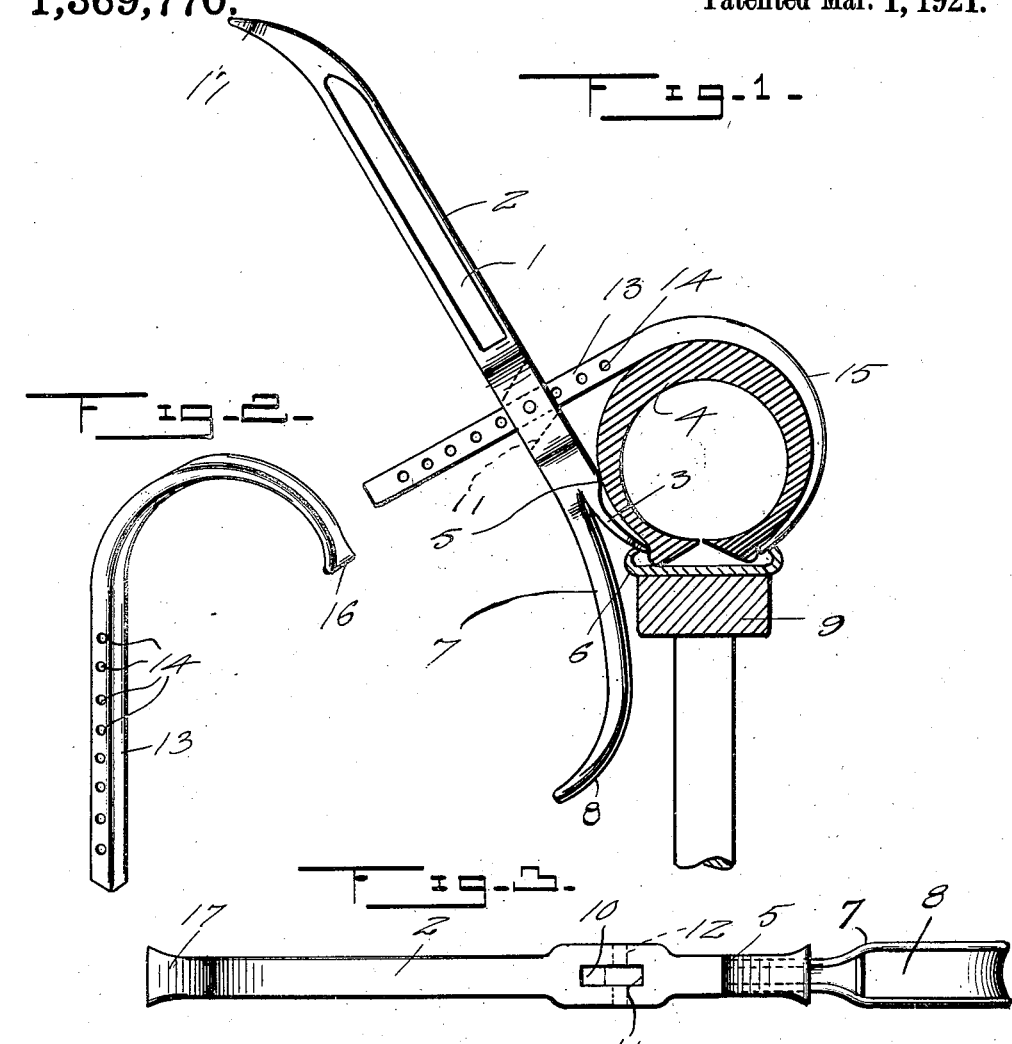

JAMES M. BAKER AND WILLIAM A. BAKER, OF CEDAR RAPIDS, IOWA.

TIRE-REMOVER.

1,369,770.  Specification of Letters Patent.  Patented Mar. 1, 1921.

Application filed December 12, 1917. Serial No. 206,797.

*To all whom it may concern:*

Be it known that we, JAMES M. BAKER and WILLIAM A. BAKER, citizens of the United States, residing at Cedar Rapids, in the county of Linn and State of Iowa, have invented certain new and useful Improvements in Tire-Removers; and we do hereby declare the following to be a full, clear, and exact description of the invention, such as will enable others skilled in the art to which it appertains to make and use the same.

This invention relates to improvements in tire removers and has for one of its objects the provision of a device of this character which will grip each bead of a tire and simultaneously move them in the direction of each other and laterally of the rim so that both sides of the tire will be removed from the rim in one single operation and at one point upon the rim.

Another object of this invention is to provide a lever having one end reduced to engage one bead of the tire and having a member connected thereto which engages the other bead so that upon downward movement of the lever the beads will be moved in the direction of each other to disengage them from the flanges of the rim at one point so that the tire can be moved laterally of the rim for disconnecting it therefrom.

A further object of this invention is the provision of a curved extension upon the lever adapted to engage the rim of the wheel upon downward movement of the lever so as to act as a fulcrum therefor.

A still further object of this invention is the provision of a tire remover of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:—

Figure 1 is a side elevation of a tire remover constructed in accordance with our invention illustrating the same applied to a tire which is shown in section, Fig. 2 is a perspective view of the member connected to the lever, Fig. 3 is a plan view of the lever, Fig. 4 is an end view of the same, Fig. 5 is a detail sectional view illustrating a groove in the fulcrum for the purpose of receiving a pad.

Referring in detail to the drawing, the numeral 1 indicates a lever having its edges rounded as illustrated at 2 to form an efficient hand grip thereto. The lever has one end thereof reduced and curved to form an extension 3. The extension 3 has its free end flattened for engagement with one bead of a tire 4 as illustrated in Fig. 1. The extension 3 being reduced and curved forms a shoulder 5 that engages the side of the tire while the free end of the extension engages the rim 6 and the bead heretofore mentioned. An arcuate shaped member 7 is formed upon the lever 1 adjacent the extension 3 and extends in an opposite direction from the extension and has its convex face provided with a groove 8 for the purpose of receiving a suitable padding material, which material is adapted to prevent the member 7 from marring or injuring the spokes of the wheel when in engagement therewith permitting the member 7 to act as a fulcrum for the lever.

The lever 1 is provided with an elongated opening 10, the walls of which are inclined as illustrated at 11 and is provided with a transverse aperture 12. An arm 13 is provided with a plurality of spaced apertures 14, any of which are adapted to be brought into registration with the aperture 12 of the lever 1 by inserting the arm through the elongated opening 10 and be pivotally secured to the lever by means of a bolt passing through the aperture 12 and one of the apertures 14 of the arm. One of the ends of the arm 13 is bent to form a hook 15 which is adapted to conform to the contour of the tire 4 as illustrated in Fig. 1. The free end of the hook portion 15 of the arm 13 is flattened and flared as illustrated at 16 to engage the other bead of the tire 4 so that upon downward movement of the lever 1 the hook portion 15 tightly grips the tire and coöperates with the extension 3 in moving the beads of the tire in the direction of each other and simultaneously moving the tire at one point upon the rim laterally of the rim, thereby removing the same from the rim. By having the arm 13 provided with a plurality of apertures 14 permits the arm to be adjusted in relation to the lever so that the device can be applied to tires of several sizes. The free end of the lever 1 is flattened and slightly curved as illustrated at 17 for the purpose of permitting the device to be employed as an instrument for applying tires to rims. By placing the tire partially upon a rim, the end 17 of the lever 1 may be inserted between the bead of the tire and the rim and by swinging the lever upwardly, the tire will be slid laterally on to the rim.

While we have shown and described the preferred embodiment of our invention, it will be understood that minor changes in construction, combination, and arrangement of parts may be made without departing from the spirit and scope of the invention as claimed.

Having thus described our invention, what we claim is:

1. A tire removing tool comprising a lever provided at one end with an initial fulcrum and tire-bead engaging arm and a final fulcrum arm rigid therewith, the final fulcrum arm being longer than and extending beyond the initial fulcrum arm and coming into action against another part of the wheel to extend the lever operation upon a continuous pull of the lever, and a tire embracing and other tire-bead engaging hook pivoted to said lever between the ends thereof.

2. A tire removing tool comprising a lever provided at one end with an initial fulcrum and tire-bead engaging arm and a final fulcrum arm rigid therewith, the fulcrum arms being reversely curved and the final fulcrum arm being longer than and extending beyond the initial fulcrum arm and coming into action against another part of the wheel to extend the lever operation upon a continuous pull of the lever, and a tire embracing and other tire-bead engaging hook pivoted to said lever between the ends thereof.

3. A tire removing tool comprising a lever provided at one end with a pair of relatively fixed reversely curved fulcrum arms of different lengths, the short arm being adapted to be brought into engagement with one wheel rim flange and one tire-bead and the longer fulcrum arm extending beyond the outer end of the shorter fulcrum arm and adapted to be brought into engagement with the wheel during a continuous pull on the lever, and tire embracing and other tire-bead engaging hook pivoted to said lever between the ends thereof.

In testimony whereof we affix our signatures in presence of two witnesses.

JAMES M. BAKER.
WILLIAM A BAKER.

Witnesses:
CHARLES C. MURRAY,
JAMES W. MASTIN.